United States Patent
Pathak et al.

(10) Patent No.: US 11,995,421 B2
(45) Date of Patent: May 28, 2024

(54) REGISTER ALLOCATION HEURISTICS ORDER

(71) Applicant: Microsoft Technology Licensing, LLC, Redmond, WA (US)

(72) Inventors: Kunal Pathak, Redmond, WA (US); Andrew Edward Ayers, Cape Meares, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 17/717,941

(22) Filed: Apr. 11, 2022

(65) Prior Publication Data

US 2023/0325159 A1    Oct. 12, 2023

(51) Int. Cl.
*G06F 9/44*    (2018.01)
*G06F 8/41*    (2018.01)
*G06F 9/455*    (2018.01)

(52) U.S. Cl.
CPC ............ *G06F 8/443* (2013.01); *G06F 9/4552* (2013.01)

(58) Field of Classification Search
CPC ............................... G06F 8/443; G06F 9/4552
See application file for complete search history.

(56) References Cited

U.S. PATENT DOCUMENTS

| | | | |
|---|---|---|---|
| 8,156,481 B1 * | 4/2012 | Koh ........................ | G06F 8/35 717/154 |
| 9,436,449 B1 | 9/2016 | Chandnani et al. | |
| 2004/0216092 A1 | 10/2004 | Ayers et al. | |
| 2004/0220774 A1 | 11/2004 | Agarwal et al. | |
| 2004/0221270 A1 | 11/2004 | Witchel et al. | |
| 2004/0268309 A1 | 12/2004 | Grover et al. | |
| 2005/0022161 A1 | 1/2005 | Burger et al. | |
| 2009/0228869 A1 | 9/2009 | McKinsey et al. | |
| 2009/0313600 A1 | 12/2009 | Ayers et al. | |
| 2012/0260072 A1 * | 10/2012 | Wang ...................... | G06F 9/384 712/217 |
| 2018/0107465 A1 * | 4/2018 | Silbermintz ............ | G06F 8/447 |

OTHER PUBLICATIONS

Kunal Pathak, "Refactor LSRA's heuristics selection #52832", retrieved from <<https://github.com/dotnet/runtime/pull/52832>>, May 17, 2021, 5 pages.

(Continued)

*Primary Examiner* — Hang Pan
(74) *Attorney, Agent, or Firm* — Ogilvie Law Firm

(57) ABSTRACT

Compilation is supported and improved by varying the order of invocation of register allocation heuristics during code generation. A particular invocation order may be chosen based on one or more compilation scenario properties, such as a target processor architecture, a target operating system, a kind of source code being compiled, or optimization targets for the compiler or the generated code, or a mix thereof. Suitable heuristics invocation orders may be produced efficiently and effectively using a genetic algorithm that is adapted to make a population of invocation orders, select parents, create offspring, and assess invocation order fitness, until the population converges on optimal orders. Invocation order fitness assessments may be based on actual performance or simulated performance.

20 Claims, 5 Drawing Sheets

(56) References Cited

OTHER PUBLICATIONS

Mark Stephenson, et al., "Genetic Programming Applied to Compiler Heuristic Optimization", retrieved from <<http://groups.csail.mit.edu/commit/papers/03/GP-HeuristicOpt-EuroGP.pdf>>, 2003, 13 pages.

John Cavazos, "Automatically Constructing Compiler Optimization Heuristics Using Supervised Learning", retrieved from <<https://www.eecis.udel.edu/~cavazos/thesis.pdf>>, Feb. 2005, 159 pages.

Vijini Mallawaarachchi, "Introduction to Genetic Algorithms—Including Example Code", retrieved from <<https://towardsdatascience.com/introduction-to-genetic-algorithms-including-example-code-e396e98d8bf3>>, Jul. 7, 2017, 9 pages.

Kunal Pathak, "Lsra heuristic tuning experiment report (#56103)", retrieved from <<https://github.com/dotnet/runtime/blob/main/docs/design/coreclr/jit/lsra-heuristic-tuning.md>>, Jul. 21, 2021, 13 pages.

"Genetic algorithm", retrieved from <<https://en.wikipedia.org/wiki/Genetic_algorithm>>, Mar. 6, 2022, 19 pages.

"Register allocation", retrieved from <<https://en.wikipedia.org/wiki/Register_allocation>>, Nov. 27, 2021, 15 pages.

"Tournament selection", retrieved from <<https://en.wikipedia.org/wiki/Tournament_selection>>, Jan. 26, 2022, 2 pages.

\* cited by examiner

REGISTER ALLOCATION HEURISTICS ORDER

BACKGROUND

Noon Computing systems often make economic, educational, scientific, and other advances feasible. Many computing systems are controlled by hardware instructions that are generated from software source code by a process known as "compilation". One variation of compilation is known as "interpretation"; a difference in this variation involves the placement of functionality that generates hardware instructions. Compilation generally takes in a source code or an intermediate language code, either being relatively close to a natural language such as English or Spanish when compared to hardware instructions. From the input code, compilation generates an output code that is closer to the machine, e.g., executable software code that contains hardware instructions executable by a processor chip. The generated code is at a less human-legible level than the input code. More generally, the code generated by compilation is either directly executable by the processor(s) of a computing system, or is at least closer than the input code to being directly executable.

Software tools that perform compilation are called "compilers". Compilation may include multiple phases, such as lexical analysis, syntax analysis, semantic analysis, intermediate code generation, intermediate code optimization, and executable code generation. Compiler writers may try to balance competing goals. One possible goal is to produce generated code as quickly as possible, e.g., to make a compiler that runs fast. Another possible goal is to produce generated code that runs as quickly as possible.

Advances are still possible in compiler technology. Advances may provide or enhance previously available benefits of various approaches to compilation.

SUMMARY

Some embodiments described herein address technical challenges related to compilation, such as how to produce generated code that runs faster than alternative functionally equivalent code, or generated code that is smaller than alternative functionally equivalent code. These goals and other generated code optimization goals, as well as the context in which the generated code will execute, may be represented computationally as scenario properties of a current target environment.

Some embodiments ascertain one or more such scenario properties, and then choose a particular register allocation heuristic invocation order based on the ascertained scenario properties. As the embodiment generates output code that is tailored to the current target environment, the embodiment invokes one or more of the register allocation heuristics in turn as specified by the chosen register allocation heuristic invocation order. Thus, the embodiment tailors the compiler's register allocation heuristic invocation order to the current target environment during the compilation, based on at least one scenario property of the current target environment.

In some cases, the correspondence between a particular register allocation heuristic invocation order and a specific set of one or more scenario properties is determined by applying a genetic algorithm. The genetic algorithm produces the particular register allocation heuristic invocation order as an optimized choice from among a population of millions of candidate invocation orders, in view of one or more specified scenario properties.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Innovations may expand beyond their origins, but understanding an innovation's origins can help one more fully appreciate the innovation. In the present case, some teachings described herein were motivated by technical challenges arising from ongoing efforts to improve code generated by Microsoft compilers. In particular, Microsoft innovators explored ways to generate code that runs faster because it allocates processor registers better. Specifically, the innovators understood that reducing the amount of mov or similar instructions that are used to free up a register, without changing the functional behavior of the generated code as a "black box", would be a safe way to make the generated code run faster.

Processor register allocation is a complex topic. A slight change in a register allocation algorithm may have a huge impact on the efficiency of generated code. Some production compilers use a fixed heuristic to select the best possible register. The Microsoft innovators conceived a way to leverage Genetic Algorithm technology, and applied it to provide solutions to the complex problem of finding an optimal register selection heuristic ordering. They verified computationally and experimentally that the combination as found by a genetic algorithm adaptation not only produced good code quality, but also was performant on various experimental test configurations.

Operating Environments

Figure 1:
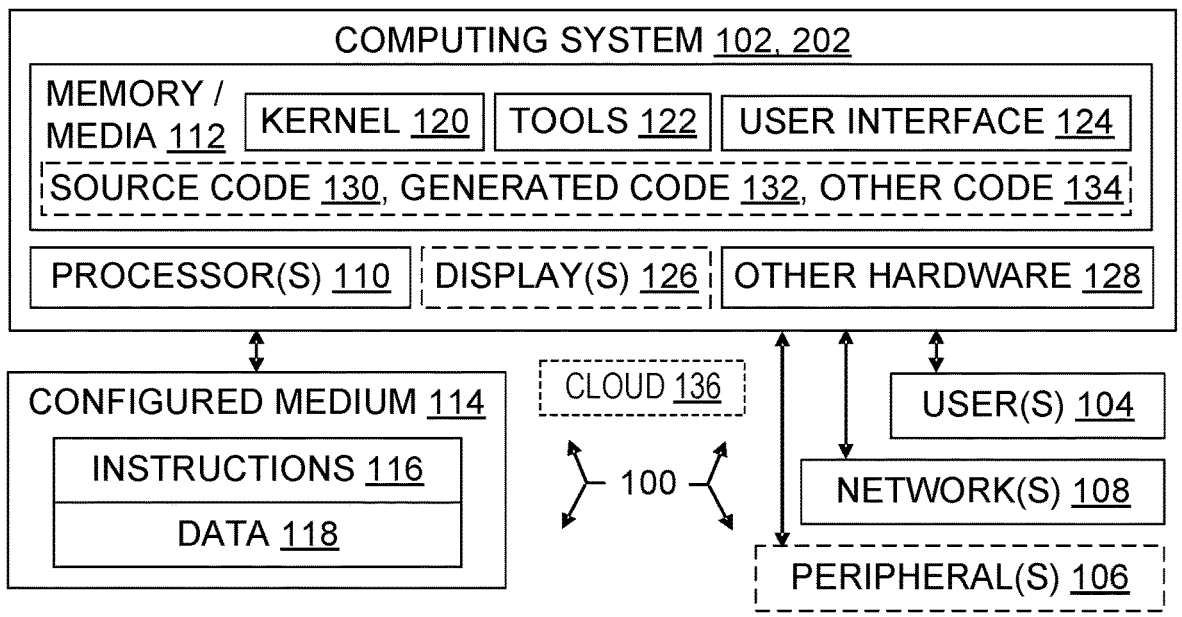
FIG. 1 is a block diagram illustrating aspects of computer systems and also illustrating configured storage media.

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. The user interface 124 may support interaction between an embodiment and one or more human users. The user interface 124 may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. Tools 122 may include software apps on mobile devices 102 or workstations 102 or servers 102, as well as APIs, browsers, or webpages and the corresponding software for protocols such as HTTPS, for example.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, register allocation heuristics ordering functionality could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
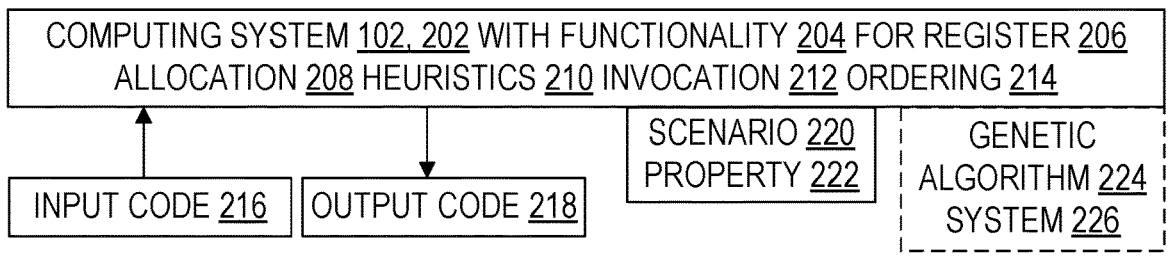
FIG. 2 is a block diagram illustrating aspects of a computing system which has one or more of the register allocation heuristics ordering enhancements taught herein.

FIG. 2 illustrates a computing system 102 configured by one or more of the register allocation heuristics ordering enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
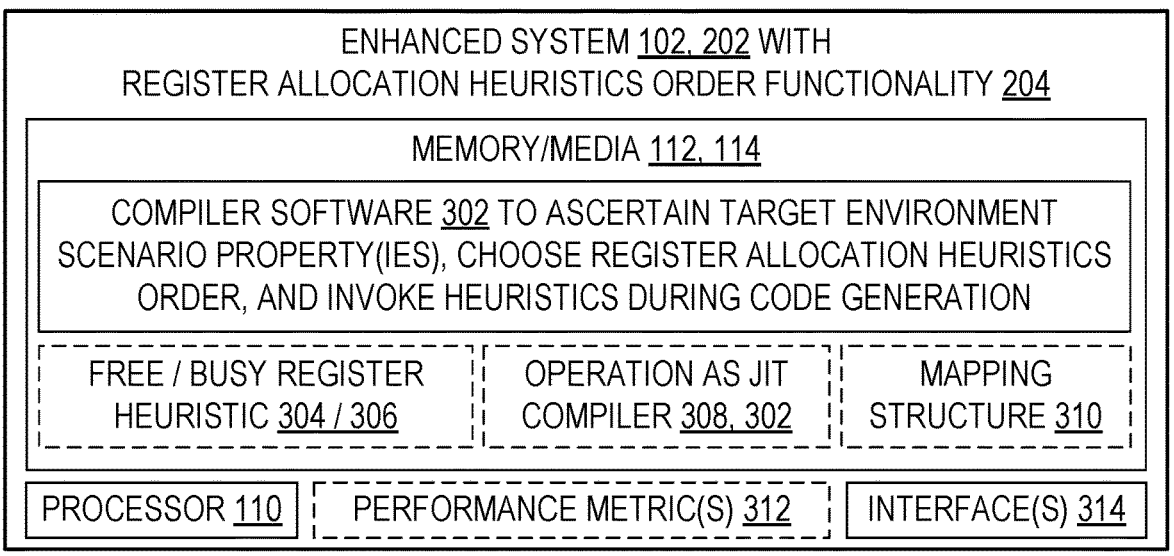
FIG. 3 is a block diagram illustrating an enhanced system configured with register allocation heuristics ordering functionality.

FIG. 3 illustrates an enhanced system 202 which is configured with compiler software 302 to provide or utilize register allocation heuristics ordering functionality 204. Software 302 and other FIG. 3 items are discussed at various points herein, and additional details regarding them are provided in the discussion of a List of Reference Numerals later in this disclosure document.

Figure 4:
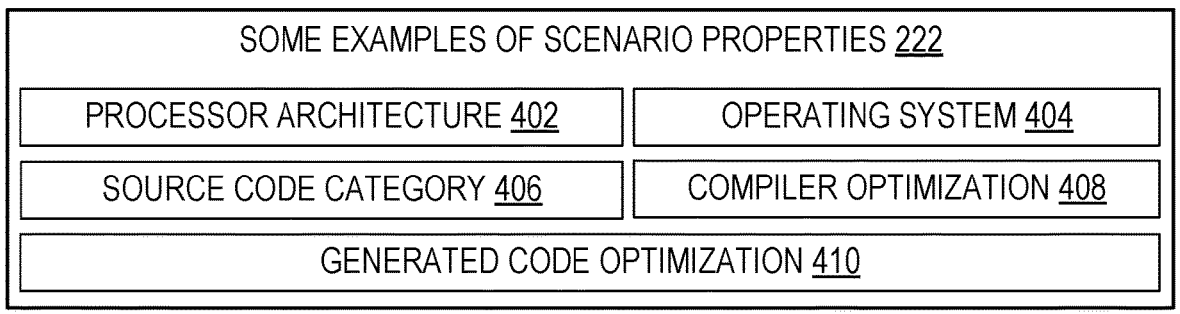
FIG. 4 is a block diagram illustrating some examples of scenario properties.

FIG. 4 shows some examples of scenario properties 222. This is not a comprehensive summary of all compilation target scenario properties 222, or a comprehensive summary of all aspects of an environment 100 or target system 102 or other context of scenario properties 222, or a comprehensive summary of all scenario property-based mechanisms for potential use in or with a system 102. FIG. 4 items are discussed at various points herein, and additional details regarding them are provided in the discussion of a List of Reference Numerals later in this disclosure document.

Figure 5:
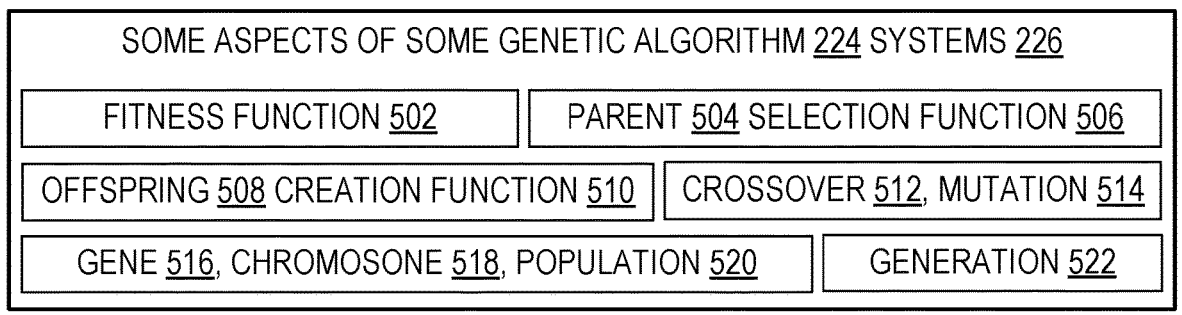
FIG. 5 is a block diagram illustrating some aspects of genetic algorithms generally.

FIG. 5 shows aspects of genetic algorithms 224. This is not a comprehensive summary of all genetic algorithms 224 or genetic algorithm 224 components, or a comprehensive summary of all genetic algorithm 224 mechanisms for potential use in or with a system 102 for compilation support such as register allocation heuristics ordering 214. FIG. 5 items are discussed at various points herein, and additional details regarding them are provided in the discussion of a List of Reference Numerals later in this disclosure document.

Figure 6:
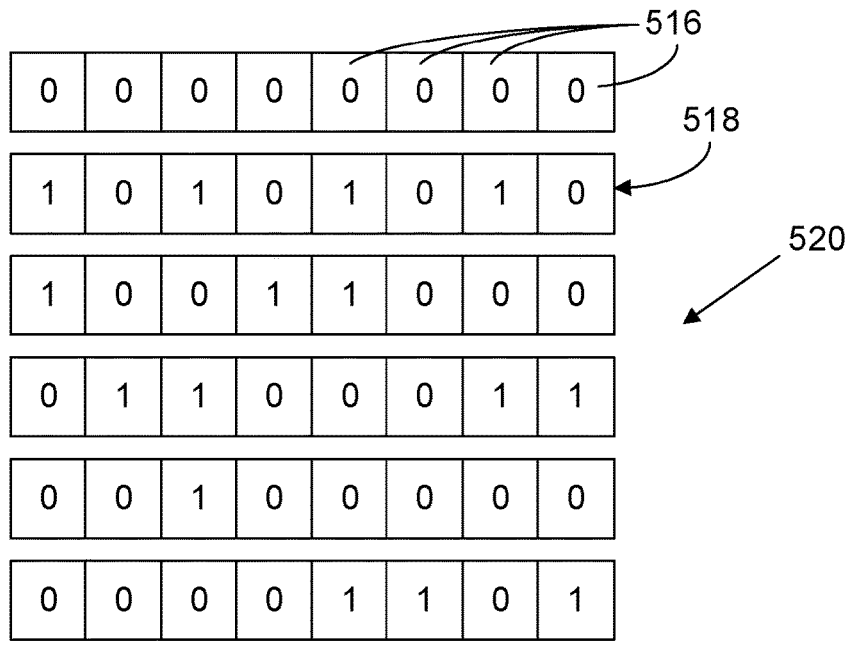
FIG. 6 is a diagram illustrating example genes and chromosomes in a population per genetic algorithms generally.

FIG. 6 shows some example genes 516 and chromosomes 518 in a population 520, as aspects both of genetic algorithms 224 generally and the present adaptation of genetic algorithms 224 for register allocation heuristics ordering 214. FIG. 6 items are discussed at various points herein, and additional details regarding them are provided in the discussion of a List of Reference Numerals later in this disclosure document.

Figure 7:
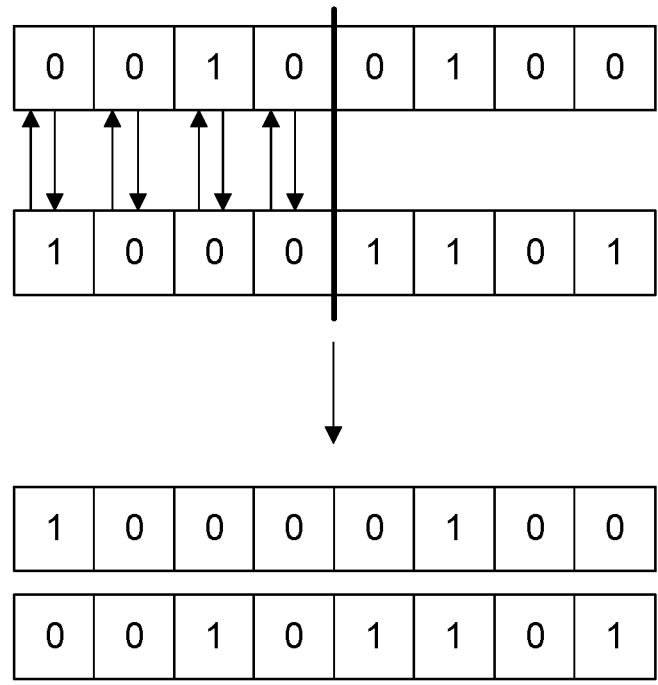
FIG. 7 is a diagram illustrating crossover per genetic algorithms generally.

FIG. 7 is a diagram illustrating a crossover 1012 in which some but not all genes 516 are swapped between two chromosomes 518. Crossover is an aspect both of genetic algorithms 224 generally and of the present adaptation of genetic algorithms 224 for register allocation heuristics ordering 214. FIG. 7 items are discussed at various points herein, and additional details regarding them are provided in the discussion of a List of Reference Numerals later in this disclosure document.

Figure 8:
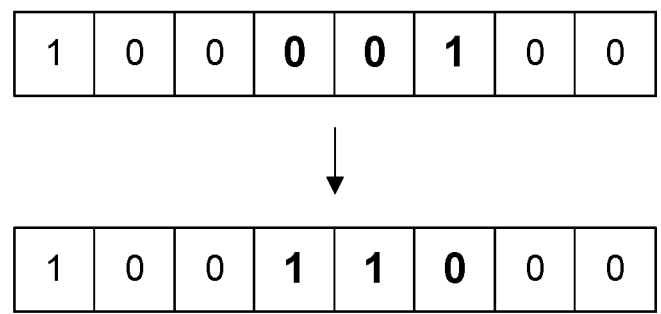
FIG. 8 is a diagram illustrating mutation per genetic algorithms generally.

FIG. 8 is a diagram illustrating a mutation 1014 in which some but not all genes 516 in a chromosome 518 are randomly (or quasi-randomly) changed. Mutation is an aspect both of genetic algorithms 224 generally and of the present adaptation of genetic algorithms 224 for register allocation heuristics ordering 214. FIG. 8 items are discussed at various points herein, and additional details regarding them are provided in the discussion of a List of Reference Numerals later in this disclosure document.

In some embodiments, the enhanced system 202 may be networked through an interface 314. An interface 314 may include hardware such as network interface cards, software such as network stacks, APIs, or sockets, combination items such as network connections, or a combination thereof.

In some embodiments, an enhanced system 202 includes a computing system 202 which is configured to produce or utilize (or both) one or more genetically produced 904 register allocation heuristics orderings 214. In particular, the system 202 may be configured with a compiler 302 that is configured to compile a source code 130. The enhanced system 202 includes a digital memory 112 and a processor 110 in operable communication with the memory. In a given embodiment, the digital memory 112 may be volatile or nonvolatile or a mix.

In this example, the compiler 302 and a set of register allocation heuristics 210 of the compiler each resides in (and thus configures) the digital memory 112. A group of register allocation heuristic invocation orders 214 also resides in and configures the digital memory.

In this example, the processor 110 is configured to perform a compilation 1016, which includes (a) ascertaining at least one scenario property 222 of a current target environment 100, (b) choosing a particular register allocation heuristic invocation order 214 based on at least a result of the ascertaining, and (c) invoking one or more of the register allocation heuristics 210 in turn as specified by the register allocation heuristic invocation order 214 while generating compiler output code 218 that is tailored to the current target environment. In this manner, the system 202 tailors the compiler's register allocation heuristic invocation order to the current target environment during the compilation, based on at least one scenario property of the current target environment.

In some circumstances, one or more scenario properties can influence the register allocation heuristic invocation order. In some embodiments, the compilation includes ascertaining at least one of the following scenario properties 222 as a basis for choosing the register allocation heuristic invocation order: a target environment processor architecture 402; a target environment operating system 404; a category 406 of the source code; a compiler optimization target 408; or a generated code optimization target 410.

In some circumstances, an adapted genetic algorithm 224 may be used to optimize register allocation heuristic invocation orders. Some embodiments include a genetic algorithm computing system 226 which executed a genetic algorithm 224 using a fitness function 502, a parent selection function 506, and an offspring creation function 510 to produce at least one of the register allocation heuristic invocation orders 214.

Some embodiments may optimize free register heuristics, busy register heuristics, or both. In some, the set of register allocation heuristics 210 includes: free register heuristics 304 which are configured to suggest a free register 206 for allocation 1018, and busy register heuristics 306 which are configured to suggest a busy register 206 for allocation 208.

Some optimizations invoke a busy register heuristic as the first heuristic. In some embodiments, at least one of the register allocation heuristic invocation orders 214 specifies a busy register heuristic 306 as a first heuristic to be invoked 212.

Some optimizations invoke a busy register heuristic before invoking at least one of the free register heuristics. In some embodiments, at least one of the register allocation heuristic invocation orders 214 specifies at least one busy register heuristic 306 to be invoked prior to at least one free register heuristic 304.

Some embodiments perform register allocation optimization 1020 for JIT (just in time) compilation 1016. In some, the compiler 302 includes or operates as a just-in-time compiler.

These example scenarios are illustrative, not comprehensive. One of skill informed by the teachings herein will recognize that many other scenarios and many other variations are also taught. In particular, different embodiments or configurations may vary as to the particular heuristics 210 or number of heuristics 210, particular scenario properties 222 or number of scenario properties 222, particular fitness function 502, particular parent selection function 506, particular offspring creation function 510, or particular source code 130 characteristics, for example, and yet still be within the scope of the teachings presented in this disclosure.

Other system embodiments are also described herein, either directly or derivable as system versions of described processes or configured media, duly informed by the extensive discussion herein of computing hardware.

Although specific compiler architecture and register allocation heuristics invocation ordering architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of input or output data, for example, as well as different technical features, aspects, version controls, security controls, mechanisms, rules, criteria, expressions, hierarchies, operational sequences, data structures, environment or system characteristics, or other functionality 204 teachings noted herein, and may otherwise depart from the particular illustrative examples provided.

Processes (a.k.a. Methods)

Figure 9:
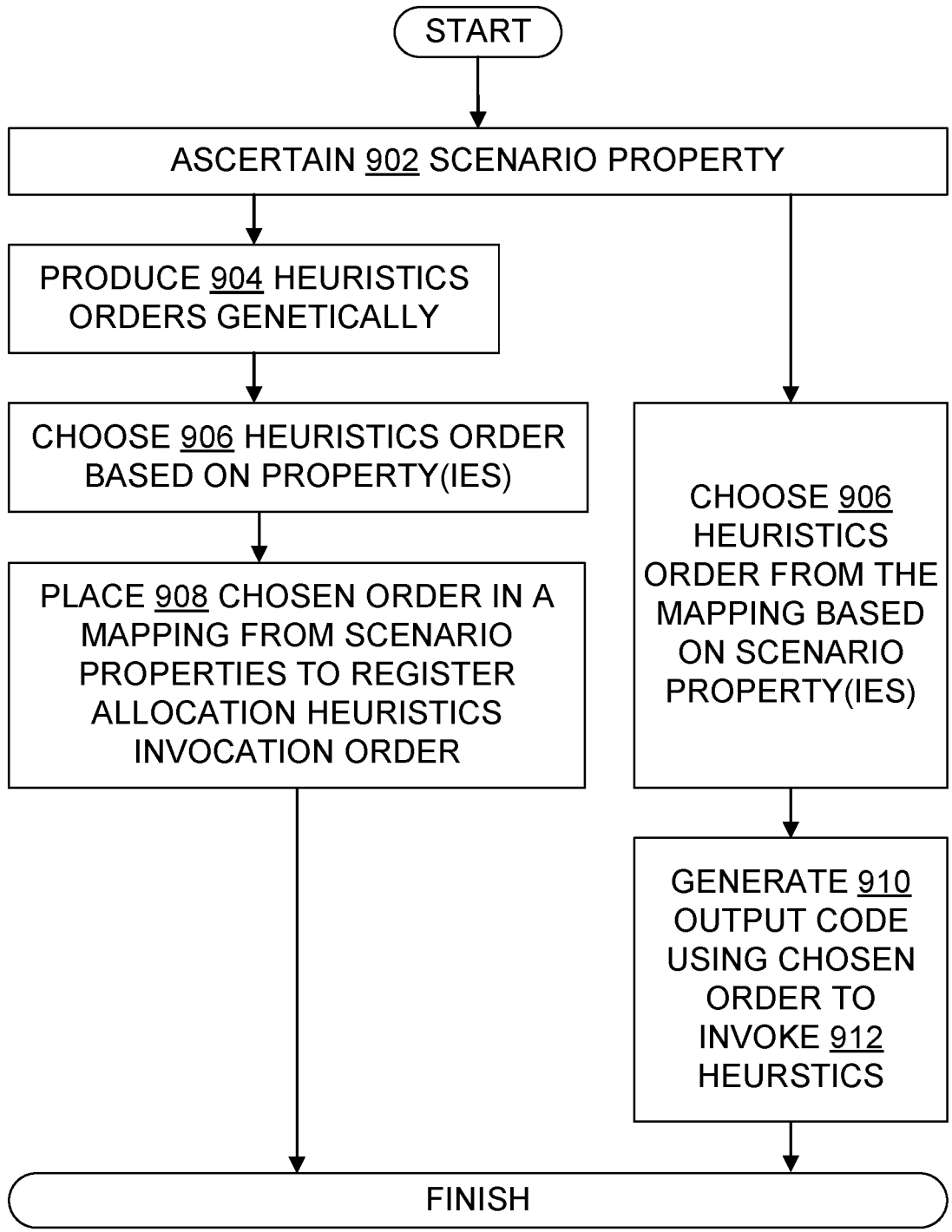
FIG. 9 is a flowchart illustrating steps in some compilation support methods, including register allocation heuristics ordering per an adaptation of genetic algorithms.
Figure 10:
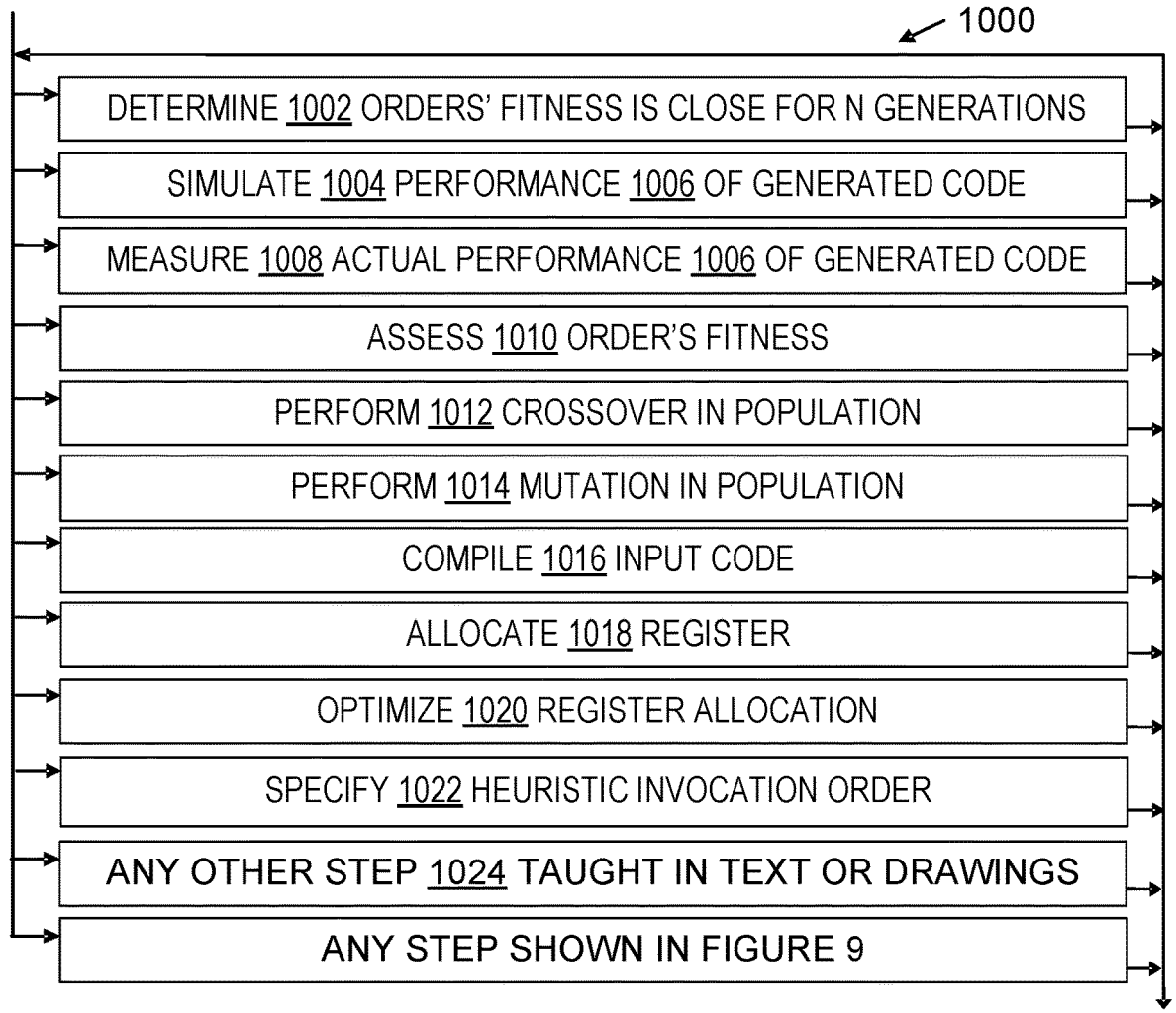
FIG. 10 is a flowchart further illustrating steps in some compilation support methods, incorporating FIG. 9.

Methods (which may also be referred to as "processes" in the legal sense of that word) are illustrated in various ways herein, both in text and in drawing figures. FIGS. 9 and 10 illustrate families of methods 900, 1000 that may be performed or assisted by an enhanced system, such as system 202 or another functionality 204 enhanced system as taught herein. FIG. 10 includes some refinements, supplements, or contextual actions for steps shown in FIG. 9, and incorporates the steps of FIG. 9 as options.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human 104 may type in a source code file name, which is then represented digitally in memory 112 for use in compilation 1016. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIGS. 9 and 10. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 900 or 1000 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments provide or utilize a compilation method, the method performed (executed) by a computing system, the method including: ascertaining 902 at least one scenario property of a current target environment; choosing 906 a particular register allocation heuristic invocation order

214 based on at least a result of the ascertaining, the particular register allocation heuristic invocation order chosen from a set of two or more register allocation heuristic invocation orders; and invoking 912 one or more of the register allocation heuristics in turn as specified by the register allocation heuristic invocation order while generating 910 compiler output code 218 that is tailored to the current target environment.

In some embodiments, the chosen particular register allocation heuristic invocation order specifies 1022 an invocation order for at least ten register allocation heuristics. A detailed example herein specifies 1022 an invocation order for seventeen heuristics 210.

Some embodiments produce 904 at least one of the register allocation heuristic invocation orders by executing 904 a genetic algorithm using a fitness function, a parent selection function, and an offspring creation function. In some embodiments, producing 904 at least one of the register allocation heuristic invocation orders includes determining 1002 that at least three candidate register allocation heuristic invocation orders are within a specified tolerance of one another for at least a specified number of generations 522.

In some embodiments, using 904 the fitness function includes simulating 1004 performance 1006 of generated compiler output code. In some embodiments, assessing 1010 the chosen particular register allocation heuristic invocation order includes measuring 1008 actual performance 1006 of generated compiler output code.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as register allocation heuristic orderings 214, compilers 302, mapping structures 310, and scenario properties 222, in the form of data 118 and instructions 116, read from a removable storage medium 114 and/or another source such as a network connection, to form a configured storage medium. The configured storage medium 112 is capable of causing a computer system 102 to perform technical process steps for register allocation heuristic invocation ordering production and usage, as disclosed herein. The Figures thus help illustrate configured storage media embodiments and process (a.k.a. method) embodiments, as well as system and process embodiments. In particular, any of the process steps illustrated in FIG. 9 or 10, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a compilation support method. This method includes: ascertaining 902 at least one scenario property of a target environment; and choosing 906 a particular register allocation heuristic invocation order based on at least a result of the ascertaining, the particular register allocation heuristic invocation order chosen from a candidate population 520 of at least one million register allocation heuristic invocation orders 214, the chosen register allocation heuristic invocation order produced by executing 904 a genetic algorithm 224.

In some embodiments, the choosing 906 chooses the register allocation heuristic invocation order 214 based on at least one of the following ascertained scenario properties 222: a target environment processor architecture; a target environment operating system; or a category of the source code. In some embodiments, the choosing 906 chooses the register allocation heuristic invocation order based on at least two of these ascertained scenario properties.

In some embodiments, the set of register allocation heuristics includes: at least one free register heuristic 304 which is configured to suggest a free register for allocation, and at least one busy register heuristic 306 which is configured to suggest a busy register for allocation, and at least one of the register allocation heuristic invocation orders 214 in the set specifies 1022 at least one busy register heuristic to be invoked prior to at least one free register heuristic.

In some embodiments, the chosen 906 particular register allocation heuristic invocation order specifies an invocation order 214 for at least twenty register allocation heuristics 210.

Some embodiments further include invoking 212 one or more of the register allocation heuristics 210 in turn as specified 1022 by the register allocation heuristic invocation order 214 while generating 910 compiler output code that is tailored to a current target environment.

In some embodiments, the choosing 906 chooses the register allocation heuristic invocation order based on at least three of the following ascertained scenario properties 222: a target environment processor architecture; a target environment operating system; a category of the source code; a compiler optimization target; or a generated code optimization target.

Some embodiments use or provide a method of allocating registers when compiling software, including: specifying a set of register selection heuristics; obtaining an ordering of the register selection heuristics by applying a genetic algorithm; and allocating registers during a compilation based on the ordering of the register selection heuristics.

Additional Observations

Additional support for the discussion of functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

In one configuration, an allocateReg( ) routine sequentially verified seventeen heuristics in the same order for all compilation target operating systems and architectures. Refactoring created an order-tuning friendly LSRA (linear scan register allocation) code generator. The refactoring extracted each heuristics application into a method, and provided an ability to call the heuristics performing methods 210 in any order, after executing any pre-requisite code. The refactoring made heuristic selection methods independent, and exposed a COMPlus_construct to dictate heuristics ordering.

One result of the refactoring included code such as the following:

```
LinearScan::allocateReg(RefPostion refPosition,
Inteval* interval)
{
  bool found = false;
  registerCandidates = allFreeCandidates( );
  if (!found) {
    found = applyHeuristics(FREE_Candidates( ));
  }
  if (!found) {
    found = applyHeuristics(CONST_AVAILABLE_Candidates( ));
  }
  ...
  if (!found) {
    found = applyHeuristics(REG_ORDER_Candidates( ));
  }
  // No free register was available, try to select one of the
  busy registers
  registerCandidates = allBusyCandidates( );
  if (!found) {
    found = applyHeuristics(SPILL_COST_Candidates( ));
  }
  if (!found) {
    found = applyHeuristics(FAR_NEXT_REF_Candidates( ));
  }
  ...
}
```

Some embodiments perform a genetic algorithm, or utilize a result of executing a genetic algorithm, or do both. Genetic algorithms were inspired by Charles Darwin's theory of natural evolution. Fittest individuals are selected for reproduction in order to produce offspring of the next generation. A genetic algorithm execution starts with an initial population, and utilizes a fitness function.

Parents are selected. Offspring are produced by performing crossover or mutation based on the parents. The fittest offspring are added to the population. This is repeated for multiple generations, applying fitness pressure to evolve the population.

As a specific example, consider a RyuJIT compiler. "RyuJIT" refers to a Microsoft .NET® just-in-time compiler (mark of Microsoft Corporation). However, the teachings can also be applied to other compilers. RyuJIT implements a linear scan register allocation (LSRA) algorithm to perform the register assignment 1018 of generated code. During register selection, LSRA has various heuristics 210 (seventeen in this example) to pick the best register candidate at a given point. Each register candidate falls in one of the two categories. If they do not contain any variable value, then they are "free" to get assigned to hold a variable value. Otherwise, they already hold some variable value, and hence are "busy". If one of the busy registers is selected during assignment, the value it currently holds is moved into memory (also called "spilling the variable") before the register is assigned to hold something else. A predecessor version of RyuJIT's LSRA has thirteen free register heuristics 304 (to pick one of the free registers) first in an invocation order, and if no free register is found, has four busy register heuristics 306 invokable next to select one of the busy registers. A busy register is selected depending on which register is cheaper to spill.

Microsoft innovators noticed that it is not always beneficial to give preference to free register candidates during register selection. Sometimes it is better to pick a busy register and retain the free register for the future reference points that are part of hot code path. In one example, free registers are allocated to the variables that are out of a for-loop. During the register assignment for variables inside the loop, no free registers are available, and the predecessor algorithm spills a busy register to store their value. It picks the same register for all the variables inside the loop and spills the previous variable values repeatedly. Apparently that happens because of the ordering of heuristics which perform register selection. Some alternatives, instead of having a fixed heuristics order, allow a tweak in the order to sometimes select busy registers first, before selecting from the pool of free registers. That insight led to a tuning of register selection heuristics, and experiments to support investigation of better register selection using different criteria. An outcome was the usage of a genetic algorithm as described herein.

As some examples of Register selection heuristics 210, heuristics 210 implemented in a RyuJIT version to select a register are shown below. Embodiments are not limited to these, or any, specific heuristics. In one implementation of orderings 214, each heuristic is represented by a letter, A, B, C, and so on, also called the heuristic "shorthand" or heuristic "identifier". Numbers or other identifiers could be used instead in other implementations.

|   | Name | Description |
| --- | --- | --- |
| A | FREE | Not currently assigned to an active interval. |
| B | CONST_AVAILABLE | A constant value that is already available in a register. |
| C | THIS_ASSIGNED | Register already assigned to the current interval. |
| D | COVERS | Covers the interval's current lifetime. |
| E | OWN_PREFERENCE | Set of preferred registers of current interval. |
| F | COVERS_RELATED | Set of preferred registers of interval that is related to the current interval and covers the lifetime. |
| G | RELATED_PREFERENCE | Set of preferred registers of interval that is related to the current interval. |
| H | CALLER_CALLEE | Caller or callee-saved registers. |
| I | UNASSIGNED | Not currently assigned to any active or inactive interval. |
| J | COVERS_FULL | Covers the interval's current lifetime until the end. |
| K | BEST_FIT | Available range is the closest match to the full range of the interval |
| L | IS_PREV_REG | Register was previously assigned to the current interval |
| M | REG_ORDER | Tie-breaker. Just pick the 1st available "free" register. |
| N | SPILL_COST | Lowest spill cost of all the candidates. |
| O | FAR_NEXT_REF | It has farther next reference than the best candidate so far. |
| P | PREV_REG_OPT | The previous reference of the current assigned interval was optional. |
| Q | REG_NUM | Tie-breaker. Just pick the 1st available "busy" register. |

Heuristics A thru M are for selecting one of the free registers, while N thru Q are for selecting one of the busy registers. A simple demonstration of how heuristic selection worked earlier is shown below. This demonstration starts with free candidates and for each heuristic, narrows those candidates. Whenever there are more than one register to pick from, this demonstration keeps trying heuristics (in the above order) until a point when there is just one register left. If no register is found, the demonstration continues the search using heuristic N to find one of the busy registers that can be spilled.

```
registerCandidates = 0; // bit-mask of all registers
LinearScan::allocateReg(RefPostion refPosition, Inteval*
interval)
{
  bool found = false;
  registerCandidates = allFreeCandidates( );
  if (!found) {
     found = applyHeuristics(FREE, FREE_Candidates( ));
  }
  if (!found) {
     found = applyHeuristics(CONST_AVAILABLE_Candidates( ));
  }
  ...
  if (!found) {
     found = applyHeuristics(REG_ORDER_Candidates( ));
  }
  // No free register was available, try to select one of
  // the busy registers
  registerCandidates = allBusyCandidates( );
  if (!found) {
     found = applyHeuristics(SPILL_COST_Candidates( ));
  }
  if (!found) {
     found = applyHeuristics(FAR_NEXT_REF_Candidates( ));
  }
  ...
}
// Filters the register candidates and returns true only if there
// is one candidate.
bool applyHeuristics(selected_candidates)
{
  filtered_candidates = registerCandidates &
selected_candidates;
  if (filtered_candidates != 0) {
     registerCandidates = filtered_candidates;
     return isSingleRegister(registerCandidates);
  }
  return false;
}
```

Given this approach, to change the order of heuristics one would have to update the above code to rearrange the portion of heuristics applied. To experiment with different heuristics ordering, it is not feasible to do such refactoring for every combination. After some research on which design pattern to pick for such problems, innovators moved the individual heuristics code into its own method (marked with_forceinline, to eliminate the throughput impact of refactoring changes). This allowed use of a function pointer to invoke one of these methods in any order desired. As a way for a user to specify heuristic order, a single letter is assigned to each heuristic, and an environment variable COMPlus_JitLsraOrdering is exposed to specify the ordering. A default ordering is "ABCDEFGHIJKLMNOPQ" (a predecessor code order), but if given something else like "PEHDCGAIJNLKOBFMQ", the refactored code would apply heuristics 210 in that order. In this particular example, the heuristic labeled P is PREV_REG_OPT and thus the compiler would apply a busy register heuristic first, followed by OWN_PREFERENCE (E), CALLER_CALLEE (H), and so forth. Using the refactored code, one can apply the busy register heuristics 306 before applying the ones 304 for free registers.

After stitching all this together, the refactored code looked like this:

```
typedef void (RegisterSelection::*HeuristicFn)( );
HashTable<char, HeuristicFn> ScoreMappingTable = {
    {'A', try_FREE},
    {'B', try_CONST_AVAILABLE},
    ...
    {'Q', try_REG_NUM}
};
LinearScan::allocateReg(RefPostion refPosition, Inteval*
interval)
{
    char *ordering = Read_COMPlus_LsraOrdering( );
    HeuristicFn fn;
    for (char order in ordering) {
       if (ScoreMappingTable->Lookup(order, &fn)) {
          bool found = (this->*fn)( );
          if (found) {
             break;
          }
       }
    }
}
bool LinearScan::try_FREE( ) {
    ...
    return applyHeuristics( );
}
...
bool LinearScan::try_CONST_AVAILABLE( ) {
    ...
    return applyHeuristics( );
}
...
bool LinearScan::try_REG_NUM( ) {
    ...
    return applyHeuristics( );
}
```

After the refactoring to support rearranging the heuristic ordering via COMPIus_JitLsraOrdering, the innovators decided to measure the impact of the reordering by running a superpmi tool (source code available on GitHub® repository, mark of GitHub, Inc.). The superpmi tool JITs all the methods of a given assembly file (*.dll or *.exe) without executing the generated machine code. Given two versions of clrjit.dll (RyuJIT binary), it also has an ability to perform the comparison of generated code and report back the number of methods that got improved or regressed in terms of CodeSize (machine code size), PerfScore (instruction latency/throughput measurements), InstructionCount (number of instructions present), etc. An effort focused on PerfScore metrics 312 because that accurately includes the cost of register spilling. If LSRA doesn't come up with optimal register choice, one would see several mov instructions that load/store into memory and that would decrease the throughput, increase the latency, and hence raise the PerfScore. If the spilling happens inside a loop, PerfScore metrics accounts for that by considering the product of loop block weights and PerfScore. Thus, a goal would be to reduce the PerfScore as much possible, as a lower PerfScore indicates better code was generated. A baseline for the comparison was the default ordering ABCDEFGHIJKLM-NOPQ, as compared with any other ordering specified in COMPlus_JitLsraOrdering. For instance, a superpmi asmdiffs–diff_jit_option JitLsraOrdering=CADHFEGOIBLKNJMPQ. A relative performance score definition is RelPerfscore=((diff−base)/base) perfscore. A total score definition is Total score=ΣRelPerfscore (all jitted methods).

Refactoring permitted one to specify any combination of sequence A thru Q and tweak the LSRA algorithm to apply a different heuristics order. But with 17 heuristics, there would be 355,687,428,096,000 (17!) possibilities to try out, and it will not be practical to do so. Accordingly, a better way was conceived: use of a genetic algorithm adaptation.

One version used code such as the following, starting with a single parent having the default JitLsraOrdering:

```
public void GeneticAlgorithm( )
{
  PrePopulate( );
  do
  {
    ValueTuple<string, string> parents = DoSelection( );
    offspring = DoCrossover(parents);
    if (rand.Next(20) % 5 == 0)
    {
      offspring = DoMutation(parents);
    }
    var score1 = CalculateFitness(offspring.Item1);
    var score2 = CalculateFitness(offspring.Item2);
    if (score1 < scor2)
    {
      population.Add(offspring.Item1);
    }
    else
    {
      population.Add(offspring.Item2);
    }
    HasConverged = CheckIfConverge( );
  } while (!HasConverged);
}
public double CalculateFitness(string offspring)
{
  return ExecuteCommand($ "python superpmi.py asmdiffs
            -diff_jit_option {offspring}
            -base_jit_option....");
}
```

A genetic algorithm starts with a community 520 that has few candidates whose fitness score is predetermined. Each candidate is made up of sequence of genes 516 and all candidates have same number of genes in them. The algorithm picks a pair of fit candidates (parents 504) and mutates their genes to produce offsprings 508. The algorithm calculates the fitness of the new offsprings and adds them (along with the fitness score) back to the community pool. As the community evolves, more and more candidates having a fitness score equivalent or better than the initial population are added to the community. The community cannot grow infinitely, so the least fit candidates die. When there are no more candidates that are more fit than the fittest candidate, the algorithm stops, yielding a set of fit candidates.

A genetic algorithm was adapted to address to the heuristic selection ordering problem. The adaptation started with "ABCDEFGHIJKLMNOPQ" (default selection order) and each letter in this combination was represented as a gene 516. The genetic algorithm mutated 1014 the genes to produce a different order, such as "ABMCDEFGHIKLN-JOPQ" and that offspring value was set in the in COMPlus_JitLsraOrdering variable. Then the subsystem 226 would run superpmi.py to produce the generated code, and compare the PerfScore with that of the one produced by the default order. PerfScore represents the fitness, and the lower the value of that metric, the more fit the corresponding candidate, namely, the better is the heuristic ordering 214.

Shown below is a pseudo code of a genetic algorithm adaptation used in experiments to find an optimal heuristic ordering. In this example, candidates are picked from the community 520 using tournament selection. Tournament selection runs tournaments among a few chromosomes 518 chosen at random from the population 520. Chromosomes 518 represent orderings 214. Crossover 512 is performed on the winner of each tournament, namely, the one with the best fitness.

```
int MaxPopulation = 100; // Maximum population per generation
HashMap<string, float> Community = new HashMap<string, float>( );
HashMap<string, float> NextGen = new HashMap<string, float>( );
void GeneticAlgorithm( ) {
  PopulateCommunity( );
  do {
    NextGen = new HashMap<string, float>( ); // new generation
    candidateCount = 0;
    while(candidateCount++ < MaxPopulation) {
      // Tournament selection method to pick candidates
      (parent1, parent2) = DoSelection( );
      // Mutate parent genes to produce offsprings
      (offspring0, offspring1) = MutateGenes(parent1,
parent2)
      AddNewOffspring(offspring0) // Add to the community
      AddNewOffspring(offspring1)
    }
    Community = NextGen;
  } while (uniqueCandidates);
}
void PopulateCommunity( ) { // Populate with random candidates
  candidateCount = 0;
  while(candidateCount < MaxPopulation) {
    newCandidate =
    GetRandomCombination("ABCDEFGHIJKLMNOPQ")
    AddNewOffspring(newCandidate)
  }
}
void ComputeFitness(candidate) {
  perfScore = exec("superpmi.py asmdiffs -base_jit_path
default\clrjit.dll -diff_jit_path other\clrjit.dll -
diff_jit_option JitLsraOrdering=" + candidate)
  return perfScore
}
// Compute fitness of offspring and add them to the community
void AddNewOffspring(candidate) {
  Community[candidate] = ComputeFitness(candidate)
  // Evict less fit candidate
  if (Community.Count > MaxPopulation) {
    weakCandidate = CandidateWithHighestPerfScore(Community);
    Community.Remove(weakCandidate)
  }
}
void MutateGenes(offspring0, offspring1) { // crossover, mutation
  assert(offspring0.Length == offspring1.Length)
  // crossover
  crossOverPoint = random(0, offspring0.Length)
  i = 0
  while (i++ < crossoverPoint) {
    char c = offspring0[i]
    offspring0[i] = offspring1[i]
    offspring1[i] = c
  }
  // mutation
  randomIndex = random(0, offspring0.Length)
  char c = offspring0[randomIndex]
  offspring0[randomIndex] = offspring1[randomIndex]
  offspring1[randomIndex] = c
  return offspring0, offspring1
}
```

Using the framework described, experiments were performed to find an optimal heuristic order. Using superpmi, one may run JIT against all the methods present in Microsoft .NET libraries and Microbenchmarks (source available on GitHub® repository). Experiments were conducted for a variety of operating systems and processor architectures, e.g., Windows®/x64, Windows®/arm64, Linux®/x64, Linux®/arm and Linux®/arm64 (marks of Microsoft Corporation, Linus Torvalds, respectively).

To facilitate experiments, some changes were to the way superpmi gathers PerfScore and reports it back. The tool superpmi.exe was modified to aggregate relative PerfScore difference of code generated by default and modified LSRA ordering. When superpmi.exe is run in parallel (which is by default), this number was reported back on the console by each parallel process. The superpmi.py script was modified to further aggregate the relative PerfScore differences of parallel superpmi.exe processes and report back the final relative PerfScore difference.

LSRA has many asserts throughout the codebase. They assume that during register selection, all the free registers are tried first before checking for busy registers. Since a goal was to understand the impact of preferring busy registers as well, those asserts were disabled. superpmi.exe asmdiffs takes two versions of clrjit.dll that you want to compare. Both must be from different location. To support experimenting with different heuristic ordering by passing different values for COMPlus_JitLsraOrdering, a copy was made of clrjit.dll→copy_clrjit.dll and passed various ordering to the copied copy_clrjit.dll.

Here is the sample invocation of superpmi.py that genetic algorithm invoked to get the PerfScore (fitness score) of each experimented ordering: python superpmi.py asmdiffs-f benchmarks-base_jit_path clrjit.dll-diff_jit_path copy_clrjit.dll-target_os windows-target_arch x64-error_limit 10-diff_jit_option JitLsraOrdering=APCDEGHNIOFJKLBMQ-log_file benchmarks_APCDEGHNIOFJKLBMQ.log Table One below shows heuristic orderings that the genetic algorithm produced for several different scenarios. The PerfScore column represents the aggregate of relative difference of PerfScore of all the methods. Using a relative difference rather than absolute difference of PerfScore helps avoid a dominant method's numbers hiding the impact of other smaller methods.

| Configuration | Ordering | PerfScore |
| --- | --- | --- |
| windows-x64 Benchmarks | EHPDGAJCBNKOLFIMQ | −36.540712 |
| windows-x64 Libraries | PEHDCGAIJNLKOBFMQ | −271.749901 |
| windows-x86 Benchmarks | EHDCFPGJBIALNOKMQ | −73.004577 |
| windows-x86 Libraries | APCDEGHNIOFJKLBMQ | −168.335079 |
| Linux-x64 Benchmarks | HGIDJNLCPOBKAEFMQ | −96.966704 |
| Linux-x64 Libraries | HDGAECNIPLBOFKJMQ | −391.835935 |
| Linux-arm64 Libraries | HECDBFGIANLOKJMPQ | −249.900161 |

As seen from Table One, there are several better orderings than the default "ABCDEFGHIJKLMNOPQ", which if used, can yield better register selection and hence, better performance of generated code. One can also see that not all orderings produced by the genetic algorithm are the same across all configurations. A goal was to find a common and similar-to-best (if not best) ordering that can benefit all the scenarios across multiple platforms. As a last step of experiment, efforts were made to apply each of the best orderings to other configurations and see how they perform.

For example, "EHPDGAJCBNKOLFIMQ" is the most optimal ordering for windows/x64/Benchmarks configuration, so it was evaluated for optimality with Linux/arm64/Libraries. Likewise, different scenarios were evaluated for "PEHDCGAIJNLKOBFMQ" (optimal ordering for windows/x64/Libraries) and so forth. Results were organized in a table (not shown, as it is large and is merely intermediate and reproducible) containing the compiled data of PerfScore from applying a best ordering of an individual configuration to other configurations. Each row contained a configuration along with the optimal ordering produced by the genetic algorithm for that configuration (i.e., scenario). The columns represented the PerfScore from applying the optimal ordering to the configuration listed in the column title. The last row in the table told the best ordering for the configuration (of that column) out of optimal orderings of all configurations.

Table Two below shows the 1st and 2nd best ordering for individual configurations.

| Configuration | 1st best | 2nd best |
| --- | --- | --- |
| windows-x64 Benchmarks | EHPDGAJCBNKOLFIMQ | PEHDCGAIJNLKOBFMQ |
| windows-x64 Libraries | PEHDCGAIJNLKOBFMQ | EHPDGAJCBNKOLFIMQ |
| windows-x86 Benchmarks | EHDCFPGJBIALNOKMQ | PEHDCGAIJNLKOBFMQ |
| windows-x86 Libraries | APCDEGHNIOFJKLBMQ | EHDCFPGJBIALNOKMQ |
| windows-arm64 Benchmarks | HECDBFGIANLOKJMPQ | HDGAECNIPLBOFKJMQ |
| windows-arm64 Libraries | HECDBFGIANLOKJMPQ | EHDCFPGJBIALNOKMQ |

Looking for a pattern under the 1st best column, one can see that the sequence E and H are often towards the beginning of the orderings, meaning that overall, it is profitable to have OWN_PREFERENCE (E) (one of the preferred registers for a given interval) or CALLER_CALLEE (H) (caller and callee registers) as one of the first few heuristic criteria invoked. Also, most of the orderings have C and D towards the beginning; these represent THIS_ASSIGNED (C) (already assigned to the current interval) and COVERS (D) (covers the lifetime of an interval). One of the busy register heuristics P that represents PREV_REG_OPT (previous reference of the currently assigned interval was optional) is also sometimes present near the beginning.

While these orderings give good PerfScores, there were several regressions observed for other orderings. Most of the regressions falls under one or more of the following categories.

There are some key challenges in LSRA's resolution phase. Once resolution moves are identified for all the blocks, there is a need to revisit those moves to see if there are some that can be optimized out. Several methods regressed their PerfScore because the allocator added lot of resolution moves at block boundaries.

Even though there is a flexibility of trying different register selection ordering, LSRA has limited knowledge about the method and portion of code for which it is allocating register. For example, during allocation, it doesn't know if it is allocating for code inside loop and that it should keep spare registers to use in that code. There could be a phase before LSRA that consolidates this information in a data structure that can be used by LSRA during register selection.

The experiments helped reveal other opportunities for optimization. LSRA may amplify regression caused by reordering the register selection heuristics. For example, if a variable is defined just once, it can be spilled at the place where it is defined and then, it doesn't need to be spilled throughout the method.

In short, register allocation is a complex topic, and a slight change in the register allocation algorithm could have huge impact on the generated code. Although various approaches may be expected to help in finding optimal heuristic selection ordering, using a genetic algorithm as taught herein was experimentally shown to find optimal orderings for given scenarios. There was also some commonality in the heuristics order that was performance efficient for majority of configurations tested. However, with many improvements, there were also regressions in many methods across all configurations. Accordingly, other areas of improvement may also be addressed, before or in conjunction with a heuristic tuning feature. Going forward, an embodiment could also auto-tune the heuristic ordering based on various factors such as how many method parameters are present, whether loops are present, exception handling, and so on.

One of skill informed by the teachings herein will recognize the advantages of those teachings over alternative approaches. For example, one potential approach would be a brute force exploration which tests every possible heuristics invocation order to find the best one(s). However, the number of register allocation order heuristics makes this approach impractical for many compilers. Even if there were only ten heuristics in a given compiler, the number of possible invocation orders would be 10!=10*9*8*7*6*5*4*3*2*1=3628800. In the case of the Microsoft compiler for which experiments were performed as discussed above, there are 17 heuristics, and hence 17! possible invocation orders. 17! is about 3.5568743×10 to the 14th power. One millionth of 17! is about 355687428, i.e., more than 350 million. Investigating even a millionth of the possible 17! by brute force, e.g., through random sampling, would have required very substantial computing resources, is clearly far beyond any mental or pen-and-paper approach, and would not be as effective at generated code performance optimization as the genetic algorithm adaptation taught herein.

Another potential approach is ad hoc manual tuning. However, in practice a person could only explore only a very small fraction of the possible orders. Specifying even one billionth of the possible invocation orders for 17 heuristics by ad hoc manual tuning would mean specifying more than three hundred thousand orders. In addition to the sheer impracticality of a person writing code to specify those orders, the risk is substantial that the choice of orders to test would be swayed by subjective biases of the person choosing them.

In short, the genetic algorithm adaptation described herein is much more efficient, and more effective, than brute force or ad hoc manual approaches when it come to the identification of optimal orders for invoking register allocation heuristics during compilation.

Technical Character

The technical character of embodiments described herein will be apparent to one of ordinary skill in the art, and will also be apparent in several ways to a wide range of attentive readers. Some embodiments address technical activities such as allocating 1018 processor 110 registers 206 during compilation 1016, simulating 1004 performance 1006 of generated 910 software code 218, and assessing 1010 the fitness of a particular order 214 for invocation 212 of register allocation heuristics 210, which are each an activity deeply rooted in computing technology. Some of the technical mechanisms discussed include, e.g., register allocation heuristics 210, compiler software 302, and data structures 310 which map scenario property sets 222 to register allocation heuristic invocation orders 214. Some of the technical effects discussed include, e.g., optimized performance 1006 of compiler generated code 218 based on an invocation order 214 that corresponds to particular scenario properties 222, avoidance of subjective bias during selection of an invocation order 214, and performance testing of millions of candidate invocation orders 214 that would have been missed by an ad hoc manual tuning approach or by a randomized brute force sampling approach. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations.

Other benefits of particular steps or mechanisms of an embodiment are also noted elsewhere herein in connection with those steps or mechanisms.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently and effectively invoke register allocation heuristics in a manner that reflects the processor architecture, kind of source code, and other properties 222 of a given compilation. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Code generation optimization operations such as register allocation heuristics invocation order selection 906, and many other operations discussed herein, are understood to be inherently digital. A human mind cannot interface directly with a CPU or other processor, or with RAM or other digital storage, to read and write the necessary data to perform the compilation support steps 1000 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as allocating, ascertaining, assessing, choosing, compiling, crossing over, determining, exploring, generating, invoking, mapping, measuring, mutating, optimizing, ordering, performing, placing, producing, simulating, specifying (and allocates, allocated, ascertains, ascertained, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102
102 computer system, also referred to as a "computational system" or "computing system", and when in a network may be referred to as a "node"
104 users, e.g., user of an enhanced system 202; refers to a human or a human's online identity unless otherwise stated
106 peripheral device
108 network generally, including, e.g., LANs, WANs, software-defined networks, clouds, and other wired or wireless networks
110 processor; includes hardware
112 computer-readable storage medium, e.g., RAM, hard disks
114 removable configured computer-readable storage medium
116 instructions executable with processor; may be on removable storage media or in other memory (volatile or nonvolatile or both)
118 digital data in a system 102
120 kernel(s), e.g., operating system(s), BIOS, UEFI, device drivers
122 tools, e.g., version control systems, cybersecurity tools, software development tools, office productivity tools, social media tools, diagnostics, browsers, games, email and other communication tools, commands, and so on
124 user interface; hardware and software
126 display screens, also referred to as "displays"
128 computing hardware not otherwise associated with a reference number 106, 108, 110, 112, 114
130 source code, e.g., text in a programming language; digital
132 generated code, e.g., machine code, assembly code, p-code, executable code, binary code; digital
134 code generally, e.g., source code, machine code, other forms of software code; digital
136 cloud, cloud computing environment
202 system 102 enhanced with functionality 204

204 functionality for register allocation heuristics invocation ordering as taught herein; e.g., software or specialized hardware which performs or is configured to perform any of the following: {steps 902-908}, {steps 902, 906, 910, 912}, software or specialized hardware which utilizes or is configured to utilize a genetically determined register allocation heuristics invocation ordering, software 302, or any software or hardware which performs or is configured to perform a method 1000 or a computational activity first disclosed herein to genetically find, or to utilize for code generation, a register allocation heuristics invocation ordering 214; "genetically" means by use of an adapted genetic algorithm as taught herein 206 processor 110 register 208 allocation of a register 206; a result of allocation 1018

210 register allocation heuristic; computational; heuristic examples are given herein but other heuristics may also be ordered genetically as taught herein 212 invocation of a heuristic 210; computational 214 order of invocation of two or more heuristics 210; also refers to the computational activity of selecting or defining such an order; examples herein use total orderings, e.g., "BDACE" but teachings herein may also be beneficially applied to produce partial orderings, e.g., "B(D or A)CE"

216 code input to a compiler, e.g., source code, object code, resource definitions; digital 218 code output from a compiler, e.g., generated 910 code; not necessarily executable in the form output but is dependent on register allocations 220 scenario, e.g., a set of one or more properties 222 or a description identifying particular sets of properties 222

222 scenario property, as represented digitally 224 genetic algorithm, as represented digitally and performed computationally 226 system 102 configured by instructions 116 to perform a genetic algorithm 302 compiler software, e.g., software which performs steps 902, 906, 910, 912 upon execution with at least one processor 110

304 heuristic which attempts to find a free register for allocation; computational 306 heuristic which attempts to find a busy register for allocation; computational 308 JIT compiler, JIT compilation; just-in-time examples of compilers and compilation 310 data structure which maps scenario property sets 222 to register allocation heuristic invocation orders 214; digital 312 generated code performance metric 314 interface generally; computational 402 a target environment processor architecture, e.g., x64, arm64

404 a target environment operating system, e.g., Windows®, *nix 406 a category of the source code to be compiled, e.g., benchmark, library, application 408 a compiler optimization target, e.g., time elapsed for compiler to generate code 410 a generated code optimization target, e.g., generated code speed, memory usage, size, power consumption, number of registers used 502 genetic algorithm fitness function, as represented in system 226 for example 504 parent ordering 214, as represented in system 226 for example 506 parent selection function, as represented in system 226 for example 508 offspring ordering 214, as represented in system 226 for example 510 offspring creation function, as represented in system 226 for example 512 crossover computational activity or result, as represented in system 226 for example 514 mutation computational activity or result, as represented in system 226 for example 516 gene, e.g., heuristic 210 identifier, as represented in system 226 for example 518 chromosome, e.g., heuristic 210 ordering 214, as represented in system 226 for example 520 population of chromosomes 518, as represented in system 226 for example 522 generation, e.g., during execution of adapted genetic algorithm 224, as represented in system 226 for example; parents 504 and their offspring 508 are in different generations 522

900 flowchart; 1000 also refers to compilation support methods that are illustrated by or consistent with the FIG. 9 flowchart 902 computationally ascertain at least one scenario property, e.g., via defaults, command line options, environment variables, or configuration data 904 computationally produce heuristics orders genetically, e.g., by executing an adapted genetic algorithm 224 in a system 102

906 computationally choose a heuristics order 214, e.g., using a fitness function and convergence criterion during execution of an adapted genetic algorithm 224, or during compilation based on at least one scenario property 222 mapped 310 to a previously produced 904 heuristics order 214

908 computationally place a produced 904 heuristics order 214 in a mapping 310

910 computationally generate output code which depends on register allocations 912 computationally invoke one or more heuristics in turn based on a heuristics order 214

1000 flowchart; 1000 also refers to compilation support methods illustrated by or consistent with the FIG. 10 flowchart (which incorporates the steps of FIG. 9)

1002 computationally determine that the fitness of particular orders 214 is within a specified tolerance for at least a specified number of generations 522; this may also be referred to as satisfying a convergence condition 1004 computationally simulate the performance of generated code 1006 performance of generated code, e.g., as to one or more of execution speed, memory usage, or bandwidth usage 1008 computationally measure the performance of generated code by executing that generated code, as opposed to measuring the generated code's performance via simulation 1004

1010 computationally assess fitness of an order 214, e.g., using a fitness function 502

1012 computationally perform a crossover 512

1014 computationally perform a mutation 514

1016 computationally compile code 1018 computationally allocate one or more registers 206 for use in generated code 1020 computationally optimize register allocation 208, e.g., by use of a genetically produced order 214 or an order chosen on the basis of scenario property(ies), or both 1022 computationally specify an order 214, e.g., by placing a digital representation of the order 214 in a variable that is referenced by a compiler code generator during register allocation 1024 any step discussed in the present disclosure that has not been assigned some other reference numeral

CONCLUSION

In short, the teachings herein provide a variety of compilation support functionalities 204 which operate in enhanced systems 202. In some embodiments, compilation 1016 is supported and improved by varying the order 214 of invocation 212 of register 206 allocation 208 heuristics 210 during code generation 910. A particular invocation order 214 may be chosen 906 based on one or more compilation scenario properties 222, such as a target processor architecture 402, a target operating system 404, a kind 406 of source code 130 being compiled, or optimization targets 408, 410 for the compiler 302 or the generated code 218, or a mix thereof. Suitable heuristics invocation orders 214 may be produced 904 efficiently and effectively using a genetic algorithm 224 that is adapted to make a population 520 of invocation orders 214, select 506 parents 504, create 510 offspring 508, and assess 1010 invocation order fitness, until the population converges on optimal orders. Invocation order fitness assessments may be based on actual 1008 performance or simulated 1004 performance.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 9 and 10 also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system which is configured with a compiler that is configured to compile a source code, the computing system comprising:
   a digital memory;
   a set of register allocation heuristics of the compiler, the register allocation heuristics and the compiler residing in the digital memory;
   a group of register allocation heuristic invocation orders residing in the digital memory;
   a processor in operable communication with the digital memory, the processor configured to perform a compilation which includes: (a) ascertaining at least one scenario property of a current target environment, (b) choosing a particular register allocation heuristic invocation order from the group of register allocation heuristic invocation orders, the choosing based on at least a result of the ascertaining, and (c) invoking one or more of the register allocation heuristics in turn as specified by the register allocation heuristic invocation order while generating compiler output code that is tailored to the current target environment;
   wherein the system tailors the compiler's register allocation heuristic invocation order to the current target environment during the compilation, based on at least one scenario property of the current target environment.

2. The computing system of claim 1, wherein the compilation includes ascertaining at least one of the following scenario properties as a basis for choosing the register allocation heuristic invocation order:
   a target environment processor architecture;
   a target environment operating system;
   a category of the source code;
   a compiler optimization target; or
   a generated code optimization target.

3. The computing system of claim 1, further comprising a genetic algorithm computing system which executed a genetic algorithm using a fitness function, a parent selection function, and an offspring creation function to produce at least one of the register allocation heuristic invocation orders.

4. The computing system of claim 1, wherein the set of register allocation heuristics includes: free register heuristics which are configured to suggest a free register for allocation, and busy register heuristics which are configured to suggest a busy register for allocation.

5. The computing system of claim 4, wherein at least one of the register allocation heuristic invocation orders specifies a busy register heuristic as a first heuristic to be invoked.

6. The computing system of claim 4, wherein at least one of the register allocation heuristic invocation orders specifies at least one busy register heuristic to be invoked prior to at least one free register heuristic.

7. The computing system of claim 1, wherein the compiler includes or operates as a just-in-time compiler.

8. A compilation method, the method executed by a computing system, the method comprising:
   ascertaining at least one scenario property of a current target environment;
   choosing a particular register allocation heuristic invocation order based on at least a result of the ascertaining, the particular register allocation heuristic invocation order chosen from a set of two or more register allocation heuristic invocation orders; and
   invoking one or more of the register allocation heuristics in turn as specified by the register allocation heuristic invocation order while generating compiler output code that is tailored to the current target environment.

9. The method of claim 8, wherein the chosen particular register allocation heuristic invocation order specifies an invocation order for at least ten register allocation heuristics.

10. The method of claim 8, further comprising producing at least one of the register allocation heuristic invocation orders by executing a genetic algorithm using a fitness function, a parent selection function, and an offspring creation function.

11. The method of claim 10, wherein producing at least one of the register allocation heuristic invocation orders comprises determining that at least three candidate register allocation heuristic invocation orders are within a specified tolerance of one another for at least a specified number of generations.

12. The method of claim 10, wherein using the fitness function comprises simulating performance of generated compiler output code.

13. The method of claim 10, further comprising assessing the chosen particular register allocation heuristic invocation order by measuring actual performance of generated compiler output code.

14. A computer-readable storage device configured with data and instructions which upon execution by a processor cause a computing system to perform a compilation support method, the method comprising:

ascertaining at least one scenario property of a target environment;

choosing a particular register allocation heuristic invocation order based on at least a result of the ascertaining, the particular register allocation heuristic invocation order chosen from a candidate population of at least one million register allocation heuristic invocation orders, the chosen register allocation heuristic invocation order produced by executing a genetic algorithm; and invoking one or more of the register allocation heuristics in turn as specified by the register allocation heuristic invocation order while generating compiler output code that is tailored to a current target environment.

15. The computer-readable storage device of claim 14, wherein the choosing chooses the register allocation heuristic invocation order based on at least one of the following ascertained scenario properties:

a target environment processor architecture;
a target environment operating system; or
a category of the source code.

16. The computer-readable storage device of claim 15, wherein the choosing chooses the register allocation heuristic invocation order based on at least two of the ascertained scenario properties.

17. The computer-readable storage device of claim 14, wherein the set of register allocation heuristics includes: at least one free register heuristic which is configured to suggest a free register for allocation, and at least one busy register heuristic which is configured to suggest a busy register for allocation, and wherein at least one of the register allocation heuristic invocation orders in the set specifies at least one busy register heuristic to be invoked prior to at least one free register heuristic.

18. The computer-readable storage device of claim 14, wherein the chosen particular register allocation heuristic invocation order specifies an invocation order for at least twenty register allocation heuristics.

19. The computer-readable storage device of claim 14, wherein the chosen register allocation heuristic invocation order specifies at least one busy register heuristic to be invoked prior to at least one free register heuristic.

20. The computer-readable storage device of claim 14, wherein the choosing chooses the register allocation heuristic invocation order based on at least three of the following ascertained scenario properties:

a target environment processor architecture;
a target environment operating system;
a category of the source code;
a compiler optimization target; or
a generated code optimization target.

* * * * *